United States Patent [19]

Kanda et al.

[11] 4,350,125
[45] Sep. 21, 1982

[54] FUEL INJECTION TYPE INTERNAL COMBUSTION ENGINE

[75] Inventors: Mutsumi Kanda; Kiyoshi Nakanishi, both of Susono; Tokuta Inoue, Mishima, all of Japan

[73] Assignee: Toyota Jidosha Kogyo Kabushiki Kaisha, Aichi, Japan

[21] Appl. No.: 182,607

[22] Filed: Aug. 29, 1980

[30] Foreign Application Priority Data

Sep. 20, 1979 [JP] Japan .................. 54/129410[U]

[51] Int. Cl.³ .................. F02B 19/16; F02B 3/00
[52] U.S. Cl. .................. 123/261; 123/259; 123/260; 123/294
[58] Field of Search .............. 123/260, 261, 263, 259, 123/275, 287, 294, 309

[56] References Cited

U.S. PATENT DOCUMENTS

| | | | |
|---|---|---|---|
| 2,018,727 | 10/1935 | Kibbe | 123/261 |
| 2,332,928 | 10/1943 | Pischinger et al. | 123/261 |
| 2,746,433 | 5/1956 | Nallinger | 123/261 |
| 3,113,560 | 12/1963 | Weshake | 123/294 |
| 3,923,015 | 12/1975 | Mukai et al. | 123/259 |
| 4,000,722 | 1/1977 | May | 123/263 |
| 4,267,806 | 5/1981 | Kanda et al. | 123/260 |

FOREIGN PATENT DOCUMENTS

| | | | |
|---|---|---|---|
| 522675 | of 1958 | Italy | 123/261 |
| 53-2722324 | 9/1978 | Japan | 123/260 |

*Primary Examiner*—Raymond A. Nelli
*Attorney, Agent, or Firm*—Stevens, Davis, Miller & Mosher

[57] ABSTRACT

A fuel injection type internal combustion engine comprising a cylinder head having a flat inner wall, and a piston having a flat top face. The flat inner wall and the flat top face form a squish area therebetween. A recess having a lung shaped cross-section is formed in the cylinder head. A shallow groove is formed on the flat inner wall of the cylinder head so as to extend from the intake valve to the recess. The exhaust valve is arranged on the bottom of the recess. A depression connected to the recess is formed on the shallow groove. The spark plug is arranged in the depression. The cylinder head has a portion located between the recess and the intake passage. A fuel injector is arranged in the intake passage. The nozzle of the fuel injector is directed to an inner wall portion of the intake passage, which is located near the recess.

11 Claims, 4 Drawing Figures

FUEL INJECTION TYPE INTERNAL COMBUSTION ENGINE

DESCRIPTION OF THE DISCLOSURE

The present invention relates to a fuel injection type internal combustion engine.

One method of improving the specific fuel consumption is by increasing the compression ratio of an engine. However, in a conventional engine, when the compression ratio is increased and, in addition, normal gasoline is used, there occurs a problem in that knocking occurs resulting in deterioration of the exhaust emission and specific fuel consumption. Consequently, in order to prevent knocking from occurring in such a conventional engine, it is necessary to use a gasoline having an octane number which is higher than that of normal gasoline. In order to increase the output power of the engine in such a way that the pressure in the combustion chamber peaks immediately after top dead center while suppressing the occurrence of knocking, it is necessary to increase the burning speed. In a high compression type engine, if the pressure in the combustion chamber peaks immediately after top dead center by increasing the burning speed while suppressing the occurrence of knocking, it is possible to approach the advancing limit of ignition timing, at which knocking occurs, to MBT (Minimum Spark Advance for Best Torque) even if normal gasoline having a low octane number is used. As a result of this, a satisfactorily high output can be obtained and, at the same time, the exhaust emission and specific fuel consumption can be improved over those of the prior art even if gasoline having a low octane number is used. However, in a conventional engine when the compression ratio is increased and, in addition, normal gasoline is used, since knocking occurs as mentioned above, the exhaust emission and specific fuel consumption deteriorate.

An object of the present invention is to provide a fuel injection type internal combustion engine with improved exhaust emission and specific fuel consumption, compared to the prior art, even if normal gasoline is used.

According to the present invention, there is provided an internal combustion engine comprising: a cylinder block having a cylinder bore therein; a piston reciprocally movable in said cylinder bore and having a substantially horizontally extending flat top face; a cylinder head having an inner wall comprising a substantially horizontally extending flat portion and a recessed portion which is arranged at a periphery of said inner wall and has a circumferential wall and a bottom wall, said flat portion being arranged at a position close to the flat top face of said piston positioned at top dead center for forming a squish area therebetween, said piston and said cylinder head forming a combustion chamber therebetween; an intake valve arranged on said flat portion and having a valve head which has a front face exposed to said combustion chamber, the front face of said valve head being arranged at a level which is approximately equal to a level of said flat portion; an intake passage formed in said cylinder head and connected to said combustion chamber via said intake valve, said cylinder head having a portion which is located between said recessed portion and said intake passage, and has a wall portion defining a portion of said intake passage; a fuel injector arranged in said intake passage and having a nozzle which is directed to said wall portion; an exhaust valve arranged on the bottom wall of said recessed portion and having a valve head; a groove formed on said flat portion and extending from the valve head of said intake valve to said recessed portion, said groove having an approximately uniform depth which is slightly larger than the clearance between said flat portion and the flat top face of said piston positioned at top dead center; and; a spark plug having a spark gap arranged in said groove.

The present invention may be more fully understood from the description of a preferred embodiment of the invention set forth below, together with the accompanying drawings.

DESCRIPTION OF A PREFERRED EMBODIMENT

Figure 1:
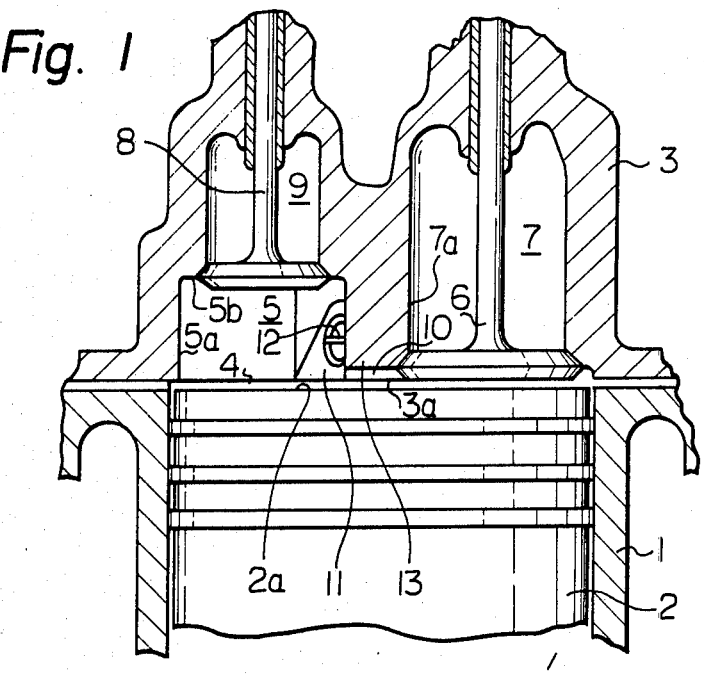
FIG. 1 is a cross-sectional side view of an engine according to the present invention, taken along the line I—I in FIG. 2.
Figure 2:
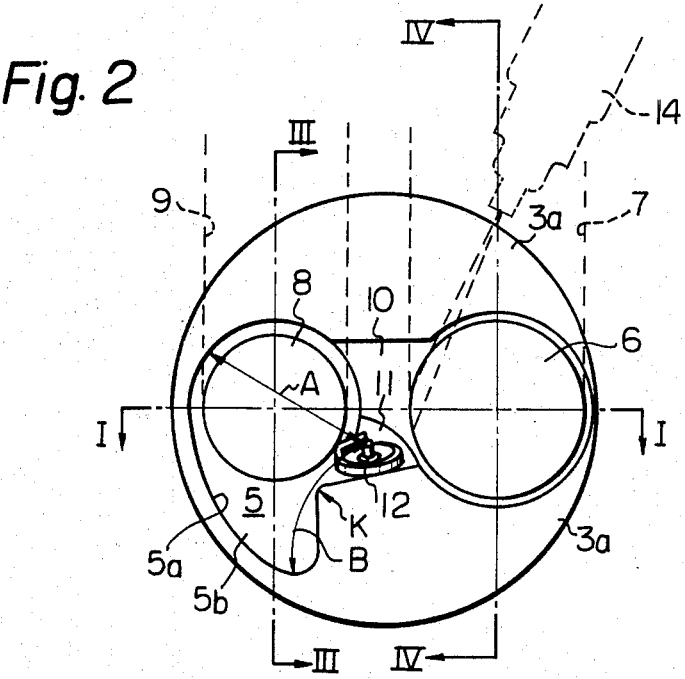
FIG. 2 is a bottom view of the cylinder head illustrated in FIG. 1.
Figure 3:
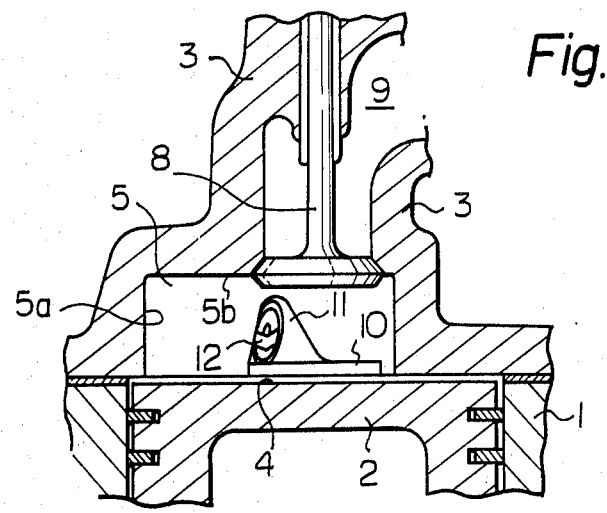
FIG. 3 is a cross-sectional side view taken along the line III—III in FIG. 2.

Referring to FIGS. 1 through 3, 1 designates a cylinder block, 2 a piston having a flat top face 2a and reciprocally moving in the cylinder block 1, 3 a cylinder head having a flat inner wall 3a and fixed onto the cylinder block 1, and 4 a combustion chamber formed between the piston 2 and the cylinder head 3; 5 designates a vertically extending recess formed in the cylinder head 3 at the periphery of the flat inner wall 3a of the cylinder head 3, 6 an intake valve, 7 an intake passage, 8 an exhaust valve and 9 an exhaust passage. The recess 5 has a vertically extending circumferential wall 5a and a horizontally extending flat bottom 5b. In addition, as is illustrated in FIG. 2, the recess 5 has a lung shaped cross-section extending in the circumferential direction of the combustion chamber 4 and having a concave contour portion K, and the exhaust valve 8 is arranged on the flat bottom 5b. On the other hand, the intake valve 6 is arranged on the flat inner wall 3a of the cylinder head 3, so that the front face of the valve head of the intake valve 6, which is exposed to the combustion chamber 4, is positioned at a level which is the same as that of the flat inner wall 3a. The piston 2 and the cylinder head 3 are so constructed that the clearance between the flat top face 2a of the piston 2 and the flat inner wall 3a of the cylinder head 3 is less than 1.25 mm when the piston 2 is positioned at top dead center, as illustrated in FIG. 1. Consequently, a horziontally extending flat squish area is formed between the flat top face 2a of the piston 2 and the flat inner wall 3a of the cylinder head 3 when the piston 2 is positioned at top dead center. As will be understood from FIG. 2, this squish area is formed so as to enclose the recess 5 and, in addition, the squish area is so formed that it has an area of more than 40 percent of the cross-sectional area of the cylinder bore of the engine. On the other hand, a shallow groove 10, having a uniform depth and extending from the valve head of the intake valve 6 towards the recess 5, is formed on the flat inner wall 3a of the cylinder head 3. As illustrated in FIG. 2, the groove 10 is arranged at the central portion of the combustion chamber 4 and has a width which is approximately equal to the diameter of the valve head of the exhaust valve 8. In addition, a depression 11 connected to the inside of the recess 5 is formed in the groove 10, and the electrode of a spark plug 12 is arranged in the depression 11. Consequently, the electrode of the spark plug 12 is positioned at approximately the center of the combustion chamber 4. As illustrated in FIGS. 2 and 3, the inner wall of the depression 11, on which the electrode of the spark plug 12 is arranged, is arranged to be slightly inclined towards the recess 5 with respect to a vertical plane passing through the axis of the intake valve 6 and the axis of the exhaust valve 8. This arrangement of the inner wall of the depression 11 is very important. In experiments conducted by the inventors, it has been proven that the effectiveness of suppressing the occurence of knocking is reduced in the case wherein the inner wall of the depression 11, on which the electrode of the spark plug 12 is arranged, is directed towards the intake valve 6.

Figure 4:
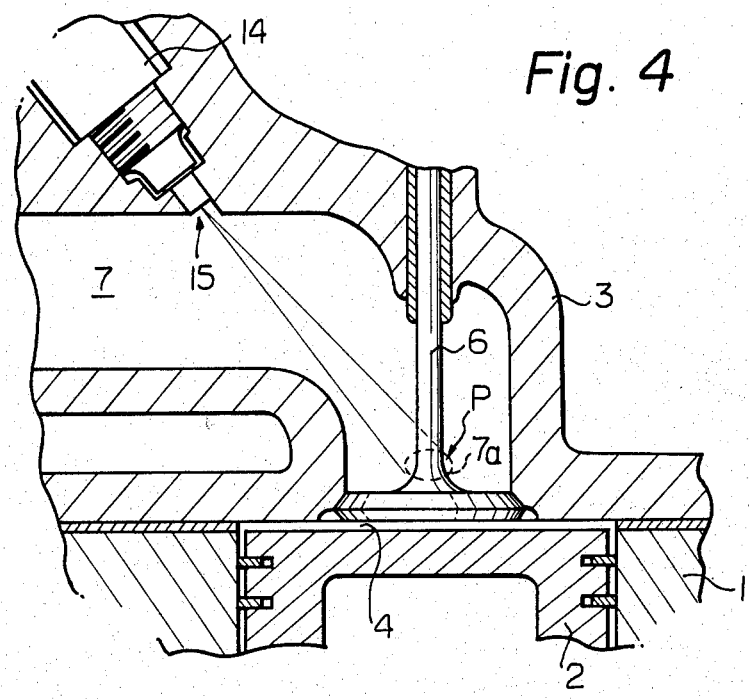
FIG. 4 is a cross-sectional side view taken along the line IV—IV in FIG. 3.

As illustrated in FIG. 1, the inner wall of the intake passage 7 has a wall portion 7a which is located near the exhaust valve 8 with respect to the intake valve 6, and the portion 13 of the cylinder head 3, which is located between the wall portion 7a of the intake passage 7 and the circumferential wall 5a of the recess 5, has a relatively thin thickness. As illustrated in FIGS. 2 and 4, a fuel injector 14 is arranged in the intake passage 7, and the nozzle 15 of the fuel injector 14 is directed to the wall portion 7a which is located near the recess 5. In FIG. 4, the region of the inner wall of the intake passage 7, onto which region fuel is injected from the fuel injector 14, is indicated by P.

In operation, since the wall portion 7a of the intake passage 7 is arranged near the recess 5 in which substantial combustion is carried out, the temperature of the wall portion 7a is higher as compared with that of the remaining inner wall portion of the intake passage 7. Consequently, since fuel, injected from the fuel injector 14, impinges on the wall portion 7a of a high temperature, the vaporization of fuel is promoted and, at the same time, the portion 13 of the cylinder head 3 is cooled by the cooling operation caused by the vaporization of fuel. Then, during the intake stroke, a combustible mixture is introduced into the combustion chamber 4 via the intake valve 6. After that the combustible mixture in the combustion chamber 4 is gradually compressed as the piston 2 moves upwards. When the piston 2 reaches about 30 degrees before top dead center, a squish flow is directly spouted, or spouted via the groove 10, into the recess 5 from the squish area formed between the flat top face 2a of the piston 2 and the flat inner wall 3a of the cylinder head 3. The squish flows flowing into the recess 5 from the periphery of the recess 5 come into violent contact with each other and, as a result, a strong turbulence is created in the recess 5. After this, when the combustible mixture is ignited by the spark plug 12, a flame core is created around the electrode of the spark plug 12 and, then, the flame core thus created rapidly grows towards the recess 5 due to the squish flow flowing in the groove 10. Since a strong turbulence is created in the recess 5 and, in addition, since the spark plug 12 is arranged near the concave contour portion K of the recess 5 so that both flame propagation distances A and B (FIG. 2), between the spark plug 12 and the points located on the vertical circumferential wall 5a at a position most remote from the spark plug 12, become minimum, the burning velocity is considerably increased.

As mentioned above, since the portion 13 of the cylinder head 3 has a relatively thin thickness and is not sufficiently cooled by the cooling water of an engine, the temperature of the portion 13 of the cylinder head 3 becomes high. Consequently, the temperature of an inner wall portion of the recess 5, which is defined by the portion 13 of the cylinder head 3, becomes higher than the remaining inner wall portion of the recess 5. However, if an inner wall portion of the recess 5, which has a high temperature, is present, unburned mixture, located near the above-mentioned inner wall portion of the recess 5, is self-ignited before the flame of the mixture, ignited by the spark plug 14, propagates to the unburned mixture. As a result, knocking occurs. Nevertheless, in the present invention, since the portion 13 of the cylinder head 3 is cooled by the cooling operation of the vaporization of the fuel injected by the fuel injector 12, the temperature of an inner wall portion of the recess 5, which is defined by the portion 13 of the cylinder head 3, is maintained low and, as a result, it is possible to prevent knocking from occuring.

When the piston 2 reaches top dead center, the distance between the flat top face 2a of the piston 2 and the flat inner wall 3a of the cylinder head 3 is reduced below the quench distance and, as a result, the flame cannot propagate into the squish area formed between the flat top face 2a of the piston 2 and the flat inner wall 3a of the cylinder head 3. After this, when the piston 2 moves downwards and reaches 15 through 25 degress after top dead center, the flame and the unburned mixture which are located in the recess 5 and the groove 10 are sucked into the squish area due to the temporary pressure drop occurring in the squish area and, as a result, the flame propagates into the squish area at an extremely high speed. As mentioned above, since the spark plug 12 is arranged at approximately the center of the combustion chamber 4, the flame which has grown around the spark plug 12 can propagate into the entire squish area for a short time when the piston 2 moves downwards. As a result of this, the burning velocity is considerably increased.

According to the present invention, since the fuel is injected from the fuel injector 14 onto the wall portion 7a of the intake passage 7, which has a high temperature, the concentration of the mixture becomes uniform within the combustion chamber and, at the same time, good combustion can be ensured. In addition, an inner wall portion of the recess 5, which is defined by the portion 13 of the cylinder head 3, is cooled by the cooling operation caused by the vaporization of fuel and, as a result, it is possible to prevent knocking from occurring. Furthermore, in the present invention, since the burning velocity is considerably increased while supressing the occurrence of knocking, it is possible to approach the advancing limit of the ignition timing, at which knocking occurs, to MBT. As a result of this, the Research Octane Number can be reduced as compared with that in a prior engine. In addition, even if a fuel having a low octane number is used, a satisfactorily high output of the engine can be obtained, and the specific fuel consumption and the exhaust emission can be improved over a prior engine.

While the invention has been described by reference to a specific embodiment chosen for purposes of illustration, it should be apparent that numerous modifications could be made thereto by those skilled in the art without departing from the spirit and scope of the invention.

We claim:

1. In an internal combustion engine comprising:
a cylinder block having a cylinder bore therein;
a piston reciprocally movable in said cylinder bore and having a flat top face;
a cylinder head having a circular inner wall portion covering the cylinder bore and comprising a flat portion substantially parallel to the top face of the piston and a recessed portion which is arranged adjacent to the periphery of said inner wall and has a circumferential wall and a top wall, said flat portion being arranged at a position close to the flat top face of said piston when the latter is positioned at top dead center for forming a squish area therebetween, said piston and said circular inner wall portion of said cylinder head forming a combustion chamber therebetween;
an intake valve arranged on said flat portion and having a valve head which has a front face exposed to said combustion chamber, the front face of said valve head being approximately coplanar with said flat portion;
an exhaust valve arranged on the top wall of said recessed portion and having a valve head;
a groove formed in said flat portion and extending from the valve head of said intake valve to said recessed portion, said groove having an approximately uniform depth which is slightly larger than the clearance between said flat portion and the flat top face of said piston when the latter is positioned at top dead center;
a depression formed in said groove adjacent to and opening into said recessed portion, said depression having a flat inner wall which is inclined downwardly and slightly towards said recessed portion with respect to a plane parallel to the axis of the cylinder bore and passing through the centers of said intake and exhaust valve heads;
a spark plug arranged in a bore in said inclined wall of the depression in said groove and having a spark gap located approximately on the axis of the cylinder bore, so that the flame propagation distances to the most remote surfaces of the circumferential walls of the recessed portion are minimized; and
an intake passage formed in said cylinder head and connected to said combustion chamber via said intake valve, said cylinder head having a portion which is located between said recessed portion and said intake passage, and which portion has a wall portion defining part of said intake passage;
the improvement wherein a fuel injector is arranged in said intake passage and has a nozzle which is directed to said wall portion.

2. An internal combustion engine as claimed in claim 1, wherein said clearance between said flat portion of said cylinder head and the flat top face of said piston positioned at top dead center is less than 1.25 mm.

3. An internal combustion engine as claimed in claim 1, wherein said squish area has an area of more than 40 percent of the cross-sectional area of said cylinder bore.

4. An internal combustion engine as claimed in claim 1, wherein said groove is arranged near the center of said combustion chamber.

5. An internal combustion engine as claimed in claim 4, wherein said groove has a width which is substantially equal to the diameter of the valve head of said exhaust valve.

6. An internal combustion engine as claimed in claim 1, wherein the spark gap of said spark plug is arranged in said depression of said groove in the vicinity of said exhaust valve.

7. An internal combustion engine as claimed in claim 1, wherein the circumferential wall of said recessed portion is arranged to be vertically extended.

8. An internal combustion engine as claimed in claim 7, wherein said recessed portion has a lung shaped cross-section extending in a circumferential direction of said combustion chamber from said exhaust valve and having a concave contour portion, the spark gap of said spark plug being arranged in the vicinity of said concave contour portion.

9. In an internal combustion engine comprising:
a cylinder block having a cylinder bore therein;
a piston reciprocally movable in said cylinder bore and having a horizontally extending flat top face;
a cylinder head having an inner wall comprising a horizontally extending flat portion and a recessed portion which is arranged at a periphery of said inner wall and has a circumferential wall and a bottom wall, said flat portion being arranged at a position close to the flat top face of said piston positioned at top dead center for forming a squish area therebetween, said piston and said cylinder head forming a combustion chamber therebetween;
an intake valve arranged on said flat portion and having a valve head which has a front face exposed to said combustion chamber, the front face of said valve head being substantially coplanar with said flat portion;
an exhaust valve arranged on the bottom wall of said recessed portion and having a valve head;
a groove formed on said flat portion and extending from the valve head of said intake valve to said recessed portion, said groove having an approximately uniform depth which is slightly larger than the clearance between said flat portion and the flat top face of said piston positioned at top dead center;
a spark plug having a spark gap arranged in said grooves; and
an intake passage formed in said cylinder head and connected to said combustion chamber via said intake valve, said cylinder head having a portion which is located between said recessed portion and said intake passage, and which portion has a wall portion defining part of said intake passage;
the improvement wherein a fuel injector is arranged in said intake passage and has a nozzle which is directed to said wall portion.

10. An internal combustion engine as claimed in claim 9, wherein a depression connected to said recessed portion is formed on said groove, the spark gap of said spark plug being arranged in said depression.

11. An internal combustion engine as claimed in claim 10, wherein said depression has an inner wall which is connected to the circumferential wall of said recessed portion and on which the spark gap of said spark plug is arranged, the inner wall of said depression being arranged to be slightly inclined towards said recessed portion with respect to a vertical plane passing through an axis of said intake valve and an axis of said exhaust valve.

* * * * *